March 19, 1940.　　　J. A. TRABUT　　　2,194,412

AUXILIARY WINDING FOR TRANSFORMERS

Filed Feb. 10, 1937　　　2 Sheets-Sheet 1

Inventor
Jean Auguste Trabut

March 19, 1940.  J. A. TRABUT  2,194,412

AUXILIARY WINDING FOR TRANSFORMERS

Filed Feb. 10, 1937  2 Sheets-Sheet 2

Inventor
Jean Auguste Trabut

Patented Mar. 19, 1940

2,194,412

UNITED STATES PATENT OFFICE 2,194,412

AUXILIARY WINDING FOR TRANSFORMERS

Jean Auguste Trabut, Aix-les-Bains, Savoie, France, assignor to Societe Savoisienne de Constructions Electriques, Aix - les - Bains, France, a corporation of France Application February 10, 1937, Serial No. 125,028
In Germany February 15, 1936

2 Claims. (Cl. 171—119)

This invention relates to auxiliary delta windings for transformers, and more particularly for three-phase transformers, for three-phase auto-transformers and for monophase transformers forming a three-phase group.

Three-phase transformers or monophase transformers forming a three-phase group are frequently provided with an auxiliary delta winding. Such a winding may serve various purposes, for example, to balance unequal charges between phase and neutral, to stifle harmonics, to compensate a single polar short circuit of the secondary of an auto-transformer, or to feed a synchronous compensator, an inductance or other apparatus.

This type of winding is generally independent of the winding of the transformer that is provided therewith, as shown in Fig. 1. In accordance with the present invention, one phase of the auxiliary winding includes either the whole or a part of one of the main windings of the transformer.

The invention and its aims and objects will be readily understood from the following description, taken in connection with the accompanying drawings of one illustrative embodiment of the invention, the true scope of the invention being pointed out in the appended claims.

Figure 1:
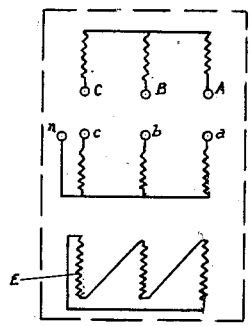
Fig. 1 shows diagrammatically a transformer of known conventional construction in which the auxiliary winding is independent of the transformer.

In Fig. 1, the transformer shown has star-mounted primary and secondary windings, the terminals of said windings respectively being indicated by ABC and $abc$, the neutral of said secondary winding issuing at $n$ and the auxiliary winding being indicated by E.

Figure 2:
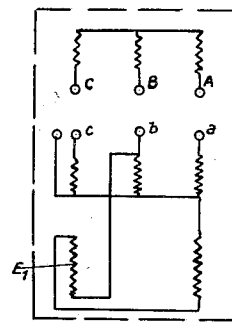
Fig. 2 shows diagrammatically an illustrative embodiment of the present invention.

Referring now to Fig. 2 showing an embodiment of the present invention, the median or third wire of the auxiliary winding $E_1$ may be constituted, for example, by the median or third winding of the secondary winding of the transformer. By using a supplementary connection only a part of the secondary winding may be used to form the third or median wire of the auxiliary winding.

Among the advantages of such an arrangement according to the present invention, are the following.

In the case of an auxiliary winding delivering on an exterior receiver, a current not in phase with the current of the main winding, the geometrical sum of said currents in the common column will be smaller than the arithmetical sum. There is therefore a distinct gain in respect to the copper of said column. As an example of such a case may be cited that of an auxiliary winding delivering on a condenser in order to improve the power factor.

Also in the case of an auxiliary winding serving only to compensate charges between phase and neutral, the elimination of one of the columns of the auxiliary winding makes for greater economy. The common column of the main winding, by reason of its being used for the auxiliary circuit, not having to bear or support an overload, need never be greater in its dimensions than the others.

Figure 3:
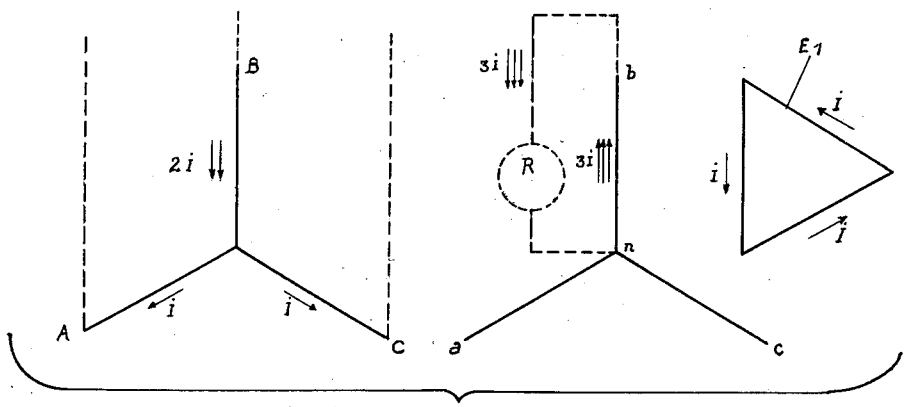
Fig. 3 represents diagrammatically an arrangement similar to Fig. 1.
Figure 4:
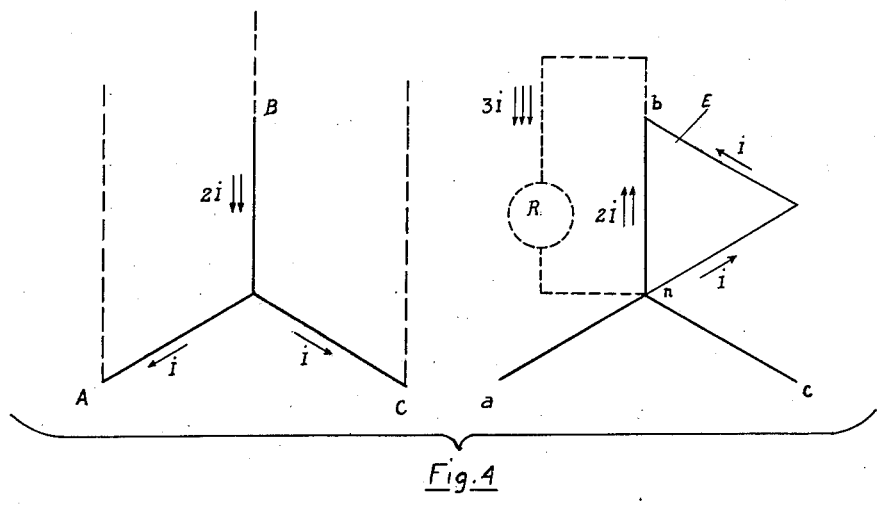
Fig. 4 represents diagrammatically an arrangement similar to Fig. 2.

Furthermore, as shown in Figs. 3 and 4, which illustrate respectively the same arrangement as in Figs. 1 and 2, the common column $bn$ (Fig. 4) is traversed only by a current $2i$ in the case of a monophase secondary charge R, which involves the circulation of a current $3i$, while with a third winding, completely separate or distinct from the secondary winding of the transformer (Fig. 3) said column will be traversed by a current $3i$. The use of a common column, in addition to being more economical, therefore also produces a distinct improvement in the efficiency in the case of an unbalanced operation.

Figure 5:
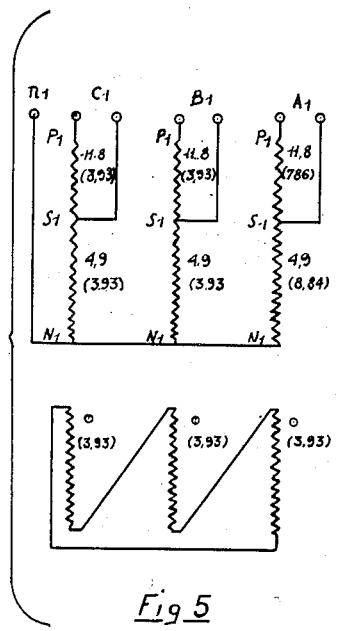
Fig. 5 shows diagrammatically an auto-transformer provided with a compensating winding to compensate unequal charges between phase and neutral, said compensating winding being separate in accordance with the known conventional construction.
Figure 6:
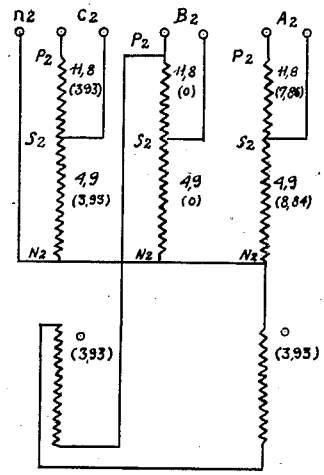
Fig. 6 shows diagrammatically a transformer like that shown in Fig. 5 with this difference, that the compensating winding is in accordance with the present invention.

In the case of an auto-transformer an additional saving may be realised in respect to the main winding. Take for example an auto-transformer of say 4 kv-a, 200/140 volts, provided with a compensating winding for balancing unequal charges between phase and neutral. Such a transformer is shown diagrammatically in Fig. 5, it being of conventional construction with a separate compensating winding. Fig. 6 shows tne same transformer but with a compensating winding in accordance with the present invention. In both of said figures the primary windings are indicated by PN, the secondary windings by SN, the columns by ABC respectively and the neutrals by $n$, said reference letters being provided in Fig. 5 with the exponent 1 and in Fig. 6 with the exponent 2. The figures not in parenthesis correspond to the balanced operation on the three phases, while those in parenthesis correspond to an unbalanced operation.

When the three branches of the auto-transformer are charged equally, the operation of both constructions will be the same. If, however, only phase A be charged to 4/3 kv-a, for example, it will be seen that in the case of Fig. 5, the strength of the current in $S^1N^1$ will be 8.84 amperes in the column $A^1$; but as the charge may be in any column, the part of the winding $S^1N^1$ for 8.84 amperes must be provided for on the three phases. With the arrangement shown in Fig. 6, on the other hand, it will be noted that the strength is equal to 0 in the column $B^2$, when the charge is in either one of the phases $A^2$ or $C^2$, thus improving the efficiency of the transformer.

Furthermore, if the charge is in the column $B^2$, the currents in the portions $P^2S^2$ and $S^2N^2$ of the winding are the same as if the charge were balanced in the three phases, say 11.8 amperes in $P^2S^2$ and 4.9 amperes in $S^2N^2$. The portion $S^2N^2$ of the winding may thus be made of a size corresponding to 4.9 amperes instead of 8.84 amperes, as in the case of the arrangement in Fig. 5. 45% is thus gained in said portion of the winding, a saving which is added to that realised by the elimination of a column of the compensating winding.

I am aware that the invention may be embodied in other specific forms without departing from the spirit or essential attributes thereof, and I therefore desire the present embodiment to be considered in all respects as illustrative and not restrictive, reference being had to the appended claims, rather than to the foregoing description to indicate the scope of the invention.

I claim:

1. In a three phase transformer group having three primary single-phase and three secondary single-phase windings connected in Y, said transformer having two compensating windings connected in inductive relation with two of the secondary single-phase windings; and said compensating windings being connected in delta with at least a portion of the third secondary single-phase winding.

2. In combination with a three phase auto transformer group, a pair of compensating windings connected in inductive relation with two of the main single-phase windings, said compensating windings being connected in delta with at least a portion of the third main single-phase winding.

JEAN AUGUSTE TRABUT.